(12) United States Patent
He (10) Patent No.: US 12,063,194 B2
(45) Date of Patent: Aug. 13, 2024

(54) MESSAGE REMINDING METHOD, APPARATUS, CONTROL DEVICE AND STORAGE MEDIUM (71) Applicant: QUECLINK WIRELESS SOLUTIONS (HF) CO., LTD., Hefei (CN)

(72) Inventor: Chunli He, Shanghai (CN)

(73) Assignee: QUECLINK WIRELESS SOLUTIONS (HF) CO., LTD., Hefei (CN)

( * ) Notice: Subject to any disclaimer, the term of this patent is extended or adjusted under 35 U.S.C. 154(b) by 359 days.

(21) Appl. No.: 17/544,889

(22) Filed: Dec. 7, 2021

(65) Prior Publication Data
US 2022/0103506 A1   Mar. 31, 2022

Related U.S. Application Data (63) Continuation of application No. PCT/CN2020/140368, filed on Dec. 28, 2020.

(30) Foreign Application Priority Data

Dec. 30, 2019 (CN) .............................. 201911390184

(51) Int. Cl.
H04L 51/222   (2022.01)
H04W 4/02    (2018.01)
H04W 4/12    (2009.01)

(52) U.S. Cl.
CPC ........... H04L 51/222 (2022.05); H04W 4/023 (2013.01); H04W 4/12 (2013.01)

(58) Field of Classification Search
None
See application file for complete search history.

(56) References Cited

U.S. PATENT DOCUMENTS

| 2013/0018951 | A1  | 1/2013 | Piccinini |              |
|--------------|-----|--------|-----------|--------------|
| 2014/0156184 | A1* | 6/2014 | Chiu      | G01C 21/3679 |
|              |     |        |           | 701/519      |
| 2017/0019856 | A1* | 1/2017 | Papakipos | G06Q 30/0251 |

FOREIGN PATENT DOCUMENTS

| CN | 101959124 A | 1/2011 |
|----|-------------|--------|
| CN | 102695121 A | 9/2012 |

(Continued)

OTHER PUBLICATIONS

First Office Action of CN201911390184.6.
(Continued)

Primary Examiner — Frantz Bataille
(74) Attorney, Agent, or Firm — J.C. PATENTS (57) ABSTRACT The present disclosure provides a message reminding method, an apparatus, a control device and a storage medium, in which an association level between a terminal and each target terminal is set; current location information of the terminal and each target terminal is obtained; determining of whether a distance between the terminal and each target terminal meets a preset condition corresponding to the association level or not is performed respectively according to the current location information of the terminal and each target terminal; if the distance between the terminal and at least one target terminal meets the preset condition corresponding to the association level, a message is sent to remind the terminal that there is a target terminal that meets the preset condition.

20 Claims, 4 Drawing Sheets (56) References Cited

FOREIGN PATENT DOCUMENTS

| | | |
|---|---|---|
| CN | 102857861 A | 1/2013 |
| CN | 104426972 A | 3/2015 |
| CN | 105279271 A | 1/2016 |
| CN | 105357636 A | 2/2016 |
| CN | 106372841 A | 2/2017 |
| CN | 106792500 A | 5/2017 |
| CN | 108156588 A | 6/2018 |
| CN | 110427572 A | 11/2019 |
| CN | 111148042 A | 5/2020 |
| EP | 2690407 | 1/2014 |
| JP | 2015164243 A | 9/2015 |
| WO | WO2015160375 A1 | 10/2015 |

OTHER PUBLICATIONS

Notice of Allowance of CN2019114060867.
International Search Report for PCT/CN2020/140368.
Supplementary European Search Report of the parallel application EP20910892.7.

\* cited by examiner

FIG. 6

MESSAGE REMINDING METHOD, APPARATUS, CONTROL DEVICE AND STORAGE MEDIUM

CROSS-REFERENCE TO RELATED APPLICATIONS

This application is a continuation of International Application No. PCT/CN2020/140368, filed on Dec. 28, 2020, which claims priority to Chinese Patent Application No. 201911390184.6, filed on Dec. 30, 2019. The disclosures of the aforementioned applications are hereby incorporated by reference in their entireties.

TECHNICAL FIELD

The present disclosure relates to terminal positioning technology and, in particular, relates to a message reminding method, an apparatus, a control device, and a storage medium.

BACKGROUND

Location Based Service (LBS) is mainly a value-added service which obtains location information (geographical coordinates, or geodetic coordinates) of a mobile terminal user through a wireless communication network of a telecommunications mobile operator (such as GSM network, CDMA network) or through an external positioning method (such as GPS), and which provides the user with corresponding services under a support of a GIS (Geographic Information System) platform.

At present, many users use the LBS to realize a connection between friends. For example, user A submits his/her location to a server through the GPS positioning system/mobile base station information, while his/her friend user B also submits his/her location to the server through the GPS positioning system/mobile base station information, and the server calculates a distance between user A and user B through coordinate calculations. Terminals of user A and user B or friends of user A and user B can actively obtain this distance location information, and then perform a location reminding to the user according to the location information.

However, in the above method, only the distance between users is stored, and a reminding of a chance encounter is not provided according to user needs, resulting in a poor user experience.

SUMMARY

In view of the above problems, the present disclosure provides a message reminding method, an apparatus, a control device and a storage medium.

In a first aspect, the present disclosure provides a message reminding method, including:
 binding a terminal with at least one target terminal, and setting an association level between the terminal and each target terminal;
 obtaining current location information of the terminal and each target terminal;
 determining respectively whether a distance between the terminal and each target terminal meets a preset condition corresponding to the association level or not, according to the current location information of the terminal and each target terminal;
 if the distance between the terminal and at least one target terminal meets the preset condition corresponding to the association level, sending a message to remind the terminal that there is a target terminal that meets the preset condition.

In other optional implementations, obtaining the current location information of the terminal and each target terminal includes:
 obtaining the current location information of the terminal;
 determining whether the current location information of the terminal is a normal location of the terminal or not;
 if not, obtaining the current location information of each target terminal bound with the terminal.

In other optional implementations, determining respectively whether the distance between the terminal and each target terminal meets the preset condition corresponding to the association level or not includes:
 determining in sequence whether the distance between the terminal and each target terminal is less than a corresponding preset distance or not, in accordance with an order of the association level, where the preset distance is correspondingly set according to the association level.

In other optional implementations, after sending the message to remind the terminal that there is the target terminal that meets the preset condition, the message reminding method further includes: storing a location where the terminal is located when the message is sent, and when a frequency of sending the message at the location is higher than a preset threshold, predicting a probability of encountering the target terminal when the terminal enters the location next time.

In other optional implementations, after sending the message, the message reminding method further includes: for each target terminal, determining whether the distance between the terminal and the target terminal is less than a distance threshold or not; counting the number of times that the distance between the terminal and the target terminal is less than the distance threshold, and updating the association level between the terminal and the target terminal when the number of times that the distance between the terminal and the target terminal is less than the distance threshold is greater than a threshold of the number of encounters.

In other optional implementations, before determining whether the current location information of the terminal is the normal location of the terminal or not, the message reminding method further includes:
 obtaining a moving trajectory of the terminal within preset time, and determining the normal location of the terminal according to the moving trajectory.

In a second aspect, the present disclosure provides a message reminding apparatus, including:
 a first processing module, configured to bind a terminal with at least one target terminal, and set an association level between the terminal and each target terminal;
 a location obtaining module, configured to obtain current location information of the terminal and each target terminal;
 a second processing module, configured to determine respectively whether a distance between the terminal and each target terminal meets a preset condition corresponding to the association level or not, according to the current location information of the terminal and each target terminal;
 a message reminding module, configured to: when the distance between the terminal and at least one target terminal meets the preset condition corresponding to the association level, send a message to remind the terminal that there is a target terminal that meets the preset condition.

In other optional implementations, the location obtaining module is specifically configured to:

obtain the current location information of the terminal;
determine whether the current location information of the terminal is a normal location of the terminal or not;
if not, obtain the current location information of each target terminal bound with the terminal.

In other optional implementations, the second processing module is specifically configured to:

determine in sequence whether the distance between the terminal and each target terminal is less than a corresponding preset distance or not, in accordance with an order of the association level, where the preset distance is correspondingly set according to the association level.

In other optional implementations, a third processing module is further included, and the third processing module is configured to:

store a location where the terminal is located when the message is sent, and when a frequency of sending the message at the location is higher than a preset threshold, predict a probability of encountering the target terminal when the terminal enters the location next time.

In other optional implementations, a fourth processing module is further included, and the fourth processing module is configured to:

for each target terminal, determine whether the distance between the terminal and the target terminal is less than a distance threshold or not; count the number of times that the distance between the terminal and the target terminal is less than the distance threshold, and update the association level between the terminal and the target terminal when the number of times that the distance between the terminal and the target terminal is less than the distance threshold is greater than a threshold of the number of encounters.

In other optional implementations, before determining whether the current location information of the terminal is the normal location of the terminal or not, the location obtaining module is further configured to:

obtain a moving trajectory of the terminal within preset time, and determine the normal location of the terminal according to the moving trajectory.

In a third aspect, the present disclosure provides a message reminding control device, including: at least one processor and a memory;

the memory stores computer execution instructions;

the at least one processor executes the computer executable instructions stored in the memory, so that the at least one processor executes the message reminding method according to any one of the above.

In a fourth aspect, the present disclosure provides a readable storage medium, having computer executable instructions stored thereon, where when a processor executes the computer executable instructions, the message reminding method according to any one of the above is implemented.

Using the message reminding method, apparatus, control device and storage medium provided by the present disclosure, the association level between the terminal and each target terminal is set; the current location information of the terminal and each target terminal is obtained; determining of whether the distance between the terminal and each target terminal meets the preset condition corresponding to the association level or not is performed respectively according to the current location information of the terminal and each target terminal; if the distance between the terminal and at least one target terminal meets the preset condition corresponding to the association level, the message is sent to remind the terminal that there is the target terminal that meets the preset condition. That is, in examples of the present disclosure, by first setting the association level between the terminal and each target terminal, and then determining whether each target terminal meets the preset condition corresponding to the association level or not, a determination of whether to send a message reminder according to user needs is realized, facilitating the communication between a user and other people, and improving the user experience.

DETAILED DESCRIPTION OF THE EMBODIMENTS

To make the purposes, technical solutions and advantages of examples of the present disclosure clearer, the technical solutions in the examples of the present disclosure are clearly and comprehensively described in the following with reference to the accompanying drawings in the examples of the present disclosure.

Location Based Service (LBS) is mainly a value-added service which obtains location information (geographical coordinates, or geodetic coordinates) of a mobile terminal user through a wireless communication network of a telecommunications mobile operator (such as GSM network, CDMA network) or through an external positioning method (such as GPS), and which provides the user with corresponding services under a support of a GIS (Geographic Information System) platform.

Figure 1:
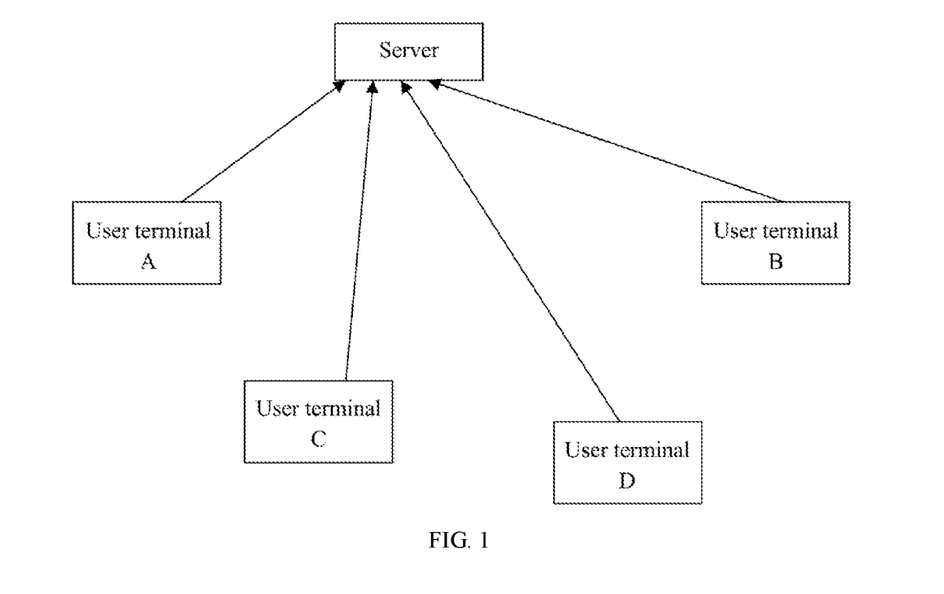
FIG. 1 is a schematic diagram of an application scenario on which the present disclosure is based.

At present, many users use the LBS to realize a connection between friends. FIG. 1 is a schematic diagram of an application scenario on which the present disclosure is based. As shown in FIG. 1, one of application scenarios on which the present disclosure is based may include a server and a plurality of user terminals. Taking the plurality of user terminals including user terminal A and user terminal B, user terminal C and user terminal D as an example, in the prior art, the plurality of user terminals submit their locations to the server through the GPS positioning system/mobile base station information, and the server calculates a distance between any two users through coordinate calculations. Any one of the user terminals can actively obtain this distance location information, and then perform a location reminding to the corresponding user according to the location information. However, in actual life, an intimacy degree between users may be close or distant. Taking user terminal A shown in FIG. 1 as a subject, the intimacy degree between users A and B is greater than the intimacy degree between users A and C, and the intimacy degree between users A and C is greater than the intimacy degree between users A and D. User A may hope to be reminded more of whether user B is nearby, which takes the first place, and then be reminded more of C which takes the second place, and finally D. But in the prior art, the intimacy degree between users is not considered, and user A will be reminded as long as a certain location distance is met, which will inevitably cause troubles to user A and waste of resources. In other words, the reminding is not performed according to user needs, resulting in a poor user experience.

In view of this problem, the present disclosure provides a message reminding method, an apparatus, a control device and a storage medium. In addition, it should be noted that in the application scenario shown in FIG. 1, each user terminal or server side can be used to execute the message reminding method described in the following embodiments to realize message reminding to each user terminal, where the user terminal can be a device with a positioning function, such as a smart phone, a smart bracelet, etc.

Figure 2:
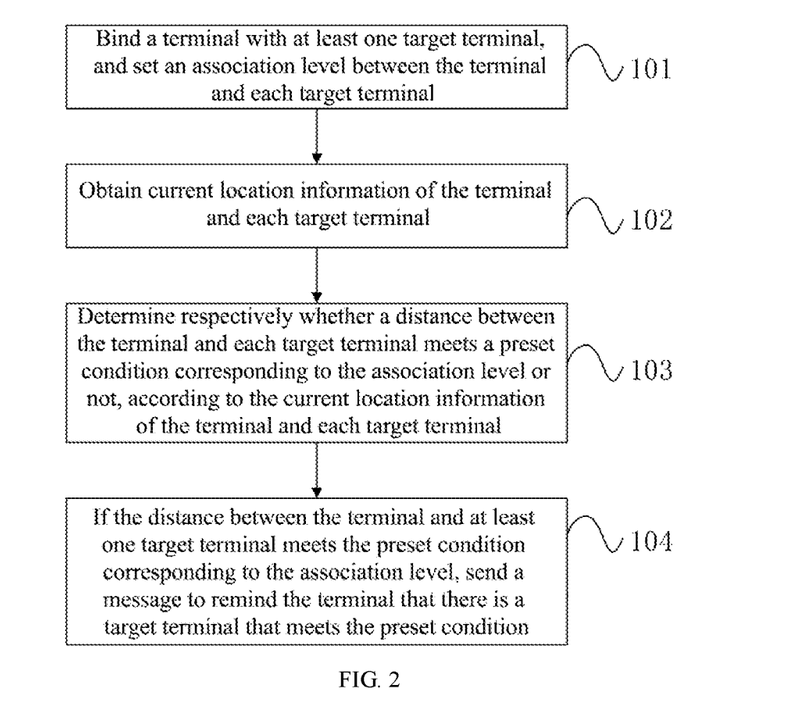
FIG. 2 is a schematic flowchart of a message reminding method according to the present disclosure.

In a first aspect, an example of the present disclosure provides a message reminding method. FIG. 2 is a schematic flowchart of a message reminding method according to the present disclosure.

As shown in FIG. 2, the message reminding method includes the following steps.

Step 101: bind a terminal with at least one target terminal, and set an association level between the terminal and each target terminal.

Specifically, which target terminals are bound with the terminal can be determined according to needs of a user, for example, by querying contact information stored in the terminal of the user so that the user can choose which contacts to bind. Preferably, when performing a binding, both parties of the binding must agree to bind in order to bind successfully, otherwise the binding fails; when one party needs to unbind, an unbinding request only needs to be put forward by one party to realize the unbinding. And after binding, the association level between the terminal and the target terminal corresponding to each contact can be set according to an intimacy degree between the user and each contact. Those with a high intimacy degree have a high association level, and those with a low intimacy degree have a low association level.

Step 102: obtain current location information of the terminal and each target terminal.

Specifically, the terminal and each target terminal can obtain the current location information of the terminal and each target terminal by turning on a navigation and positioning system, such as GPS; optionally, the terminal can initiate a positioning request at a specific time interval to obtain the current location information of the terminal and each target terminal.

Step 103: determine respectively whether a distance between the terminal and each target terminal meets a preset condition corresponding to the association level or not, according to the current location information of the terminal and each target terminal.

If the distance between the terminal and at least one target terminal meets the preset condition corresponding to the association level, execute step 104, otherwise, do not perform reminding.

Specifically, the distance between the terminal and each target terminal is calculated respectively according to the current location information of the terminal and each target terminal, and determining of whether each distance meets the corresponding preset condition or not is performed, where the preset condition corresponds to the association level. For example, the preset condition may be set to determine whether the distance between the terminal and each target terminal is less than a preset distance or not. In a case where the association level is high, the preset distance can be set to be larger, and in a case where the association level is low, the preset distance can be set to be smaller, thereby achieving a reminding for a contact with a high intimacy degree even when this contact is far apart, and a reminding for a contact with a low intimacy degree only when this contact is close in distance.

Step 104: send a message to remind the terminal that there is a target terminal that meets the preset condition.

Specifically, as long as any target terminal meets the corresponding preset condition, the terminal will be reminded to inform the user which target terminal(s) is(are) nearby, so that the user can determine whether to meet with the contact corresponding to the target terminal according to needs, etc. Preferably, reminding may be performed by a short message, or by an instant messaging tool, or by informing via a corresponding application installed on the terminal, such as a positioning APP.

Using the message reminding method provided by the example of the present disclosure, the association level between the terminal and each target terminal is set; the current location information of the terminal and each target terminal is obtained; determining of whether the distance between the terminal and each target terminal meets the preset condition corresponding to the association level or not is performed respectively according to the current location information of the terminal and each target terminal; if the distance between the terminal and at least one target terminal meets the preset condition corresponding to the association level, the message is sent to remind the terminal that there is the target terminal that meets the preset condition. That is, in the example of the present disclosure, by first setting the association level between the terminal and each target terminal, and then determining whether each target terminal meets the preset condition corresponding to the association level or not, a determination of whether to send a message reminder according to user needs is realized, facilitating the communication between the user and other people, and improving the user experience.

Figure 3:
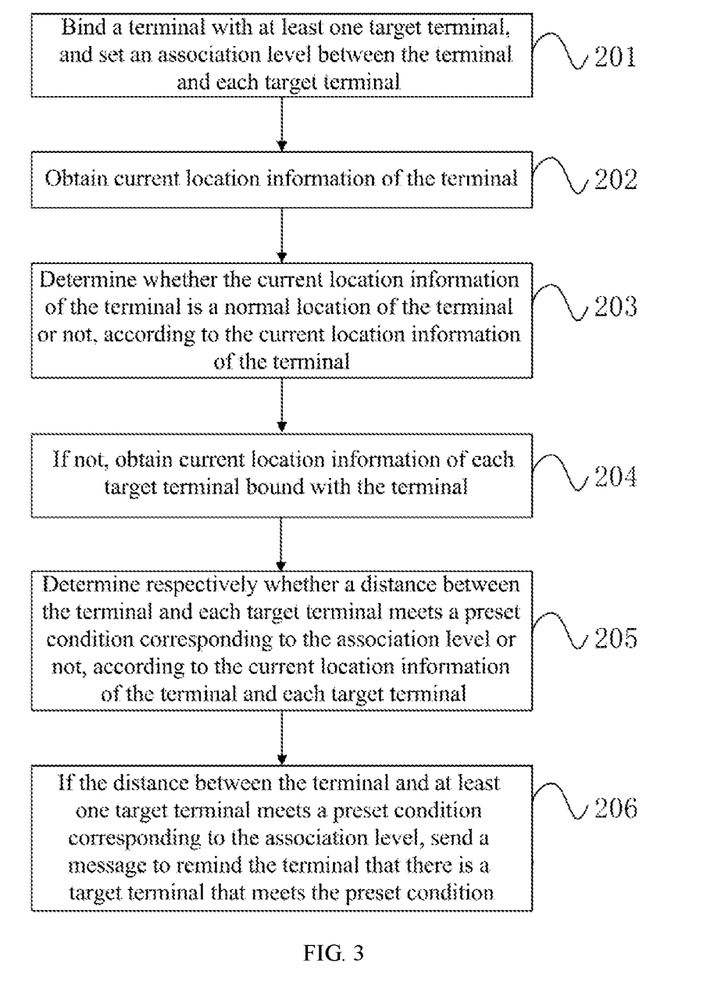
FIG. 3 is a schematic flowchart of another message reminding method according to the present disclosure.

In combination with the foregoing implementations, FIG. 3 is a schematic flowchart of another message reminding method according to the present disclosure. As shown in FIG. 3, the message reminding method includes the following steps.

Step 201: bind a terminal with at least one target terminal, and set an association level between the terminal and each target terminal.

Step 202: obtain current location information of the terminal.

Step 203: determine whether the current location information of the terminal is a normal location of the terminal or not.

If not, execute step 204; if yes, return to step 202 or end this example.

Step 204: obtain current location information of each target terminal bound with the terminal.

Step 205: determine respectively whether a distance between the terminal and each target terminal meets a preset condition corresponding to the association level or not, according to the current location information of the terminal and each target terminal.

If the distance between the terminal and at least one target terminal meets the preset condition corresponding to the association level, execute step 206; if not, do not perform reminding.

Step 206: send a message to remind the terminal that there is a target terminal that meets the preset condition.

The implementation of step 201, step 205, and step 206 in this embodiment is similar to the implementation of step 101, step 103, and step 104 in the foregoing embodiment, respectively, and will not be repeated here.

The difference from the foregoing embodiment is that in order to save resources of the terminal or server side, in this embodiment, the current location information of the terminal is obtained first, and determining of whether it is the normal location of the terminal or not is performed according to the current location information of the terminal; if not, the current location information of each target terminal bound with the terminal is then obtained, and determining of whether the distance between the terminal and each target terminal meets the preset condition or not continues, that is, step 205 is executed; on the contrary, when it is obtained by determining that the terminal is at the normal location according to the current location information of the terminal, in order to save resources, no further steps are performed, and at this time, this example can be ended, or return to step 202, that is, to re-obtain the current location information of the terminal until it is determined that it is not the normal location of the terminal according to the current location information of the terminal.

As an optional implementation, before step 203, the method can further include: obtaining a moving trajectory of the terminal within preset time, and determining the normal location of the terminal according to the moving trajectory.

Specifically, positioning information of the terminal within preset time, such as within a month, a quarter or a year, can be obtained; a large amount of the positioning information of the terminal can be stored in a database of a remote server; and the normal location of the terminal is calculated according to this large amount of the positioning information. Or the user can customize normal locations, such as home, company, etc., and can also set common trajectories, such as a school trajectory, a work trajectory, a shopping (food buying) trajectory, etc. When the user is at these normal locations or normal trajectories, the location information of the target terminal bound with the terminal will not be obtained, nor will the determining of whether the distance between these normal locations and the location of each target terminal meets the preset condition or not and so on be performed. Only when the terminal is not at the normal location, then will the location information of the bound target terminal continue to be obtained, so as to determine whether the distance meets the preset condition or not, and then to determine whether to send a message reminder.

On the basis of the foregoing embodiment, by obtaining the current location information of the terminal; determining whether it is the normal location of the terminal or not according to the current location information of the terminal; if not, obtaining the current location information of each target terminal bound with the terminal, it is realized that the message reminding is performed only when the terminal is not at the normal location, and when the terminal is at the normal location, the message reminding is not performed, which saves resources of the terminal or server side.

Figure 4:
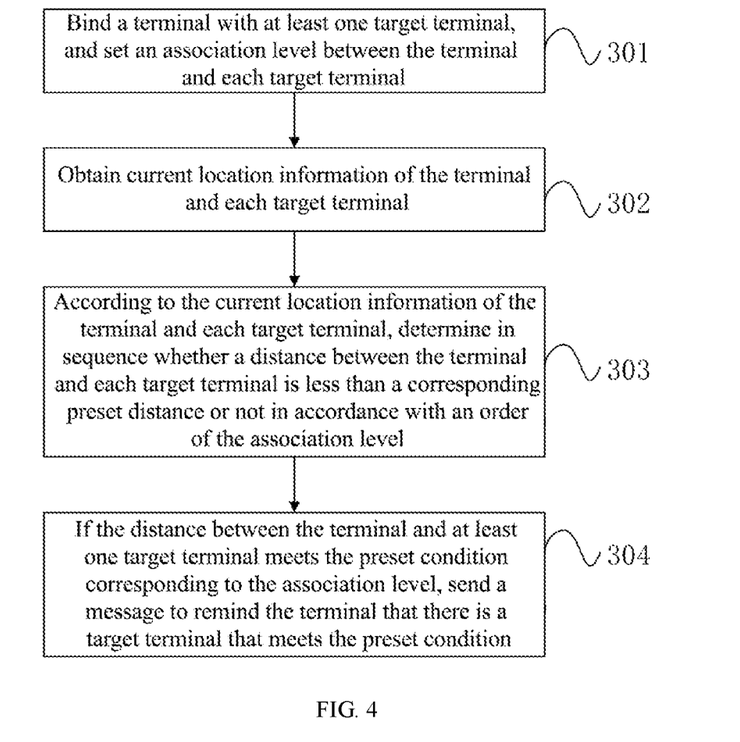
FIG. 4 is a schematic flowchart of yet another message reminding method according to the present disclosure.

In combination with the foregoing implementations, FIG. 4 is a schematic flowchart of yet another message reminding method according to the present disclosure. As shown in FIG. 4, the message reminding method includes the following steps.

Step 301: bind a terminal with at least one target terminal, and set an association level between the terminal and each target terminal.

Step 302: obtain current location information of the terminal and each target terminal.

Step 303: according to the current location information of the terminal and each target terminal, determine in sequence whether a distance between the terminal and each target terminal is less than a corresponding preset distance or not in accordance with an order of the association level.

The preset distance is correspondingly set according to the association level.

If the distance between the terminal and at least one target terminal is less than the corresponding preset distance, execute step 304; if not, do not perform reminding.

Step 304: send a message to remind the terminal that there is a target terminal that meets the preset condition.

The implementation of step 301, step 302, and step 304 in this embodiment is similar to the implementation of step 101, step 102, and step 104 in the foregoing embodiment, respectively, and will not be repeated here.

The difference from the foregoing embodiment is that in order to give priority to the reminding of whether a contact with a higher association level with the user is nearby, in this embodiment, determining of whether the distance between the terminal and each target terminal is less than the corresponding preset distance or not is performed in sequence in accordance with the order of the association level, where the preset distance is correspondingly set according to the association level.

For example, the application scenario described in FIG. 1 is taken as an example, user terminal A is taken as a subject, and it is assumed that there are contacts B, C, and D stored on user terminal A. Then it can be determined that A is bound with B, C, and D according to the needs of user A, and the association level $R_{AB}$ of users A and B is set to be greater than the association level $R_{AC}$ of users A and C, and the association level of users A and C is set to be greater than the association level $R_{AD}$ of users A and D, that is, $R_{AB}>R_{AC}>R_{AD}$. The corresponding preset distance is set according to the association level, where the preset distance DAB between users A and B is greater than the preset distance $D_{AC}$ between users A and C, and the preset distance $D_{AC}$ between users A and C is greater than the preset distance $D_{AD}$ of users A and D, that is, $D_{AB}>D_{AC}>D_{AD}$. When this embodiment is executed, location information of user A is obtained, and determining of whether it is the normal location of user A or not is performed. If it is not the normal location of user A, current location information of B, C, and D continues to be obtained, and then determining of whether the distance between current locations of users A and B is less than $D_{AB}$ or not is performed preferentially in accordance with the order of the association level. If yes, a message reminder is sent to user terminal A to inform user A that user B is nearby, and at the same time, the next step is executed to determine whether the distance between current locations of users A and C is less than $D_{AC}$ or not. If the distance between the locations of users A and B is greater than $D_{AB}$, that is, the corresponding preset condition is not met, reminding will not be performed, and the next step is executed directly to determine whether the distance between the current locations of users A and C is less than $D_{AC}$ or not, and so on, until determining for all target terminals bound with user A is completed.

It should be noted that when user B needs to be reminded, user terminal B can be taken as the subject, while other user terminals, such as A, C, and D, can be used as target terminals, and then this embodiment can be executed.

As an optional implementation, after sending the message to remind the terminal that there is the target terminal that meets the preset condition, that is, after step 304, the method further includes:

storing a location where the terminal is located when the message is sent, and when a frequency of sending the message at the location is higher than a preset threshold, predicting a probability of encountering the target terminal when the terminal enters the location next time.

Specifically, the location where the terminal is located when the terminal sends a message reminder is recorded, and the number of times of sending the message reminder is recorded. When the frequency of the message reminder occurring within a preset time period is higher than a preset threshold, for example, setting the preset threshold to be once every 2 days, if the message reminder occurs 5 times when user A passes a certain location within two days, then the next time the user enters the location or enters an area within a certain distance from the location, the probability of encountering the target terminal will be estimated and the user will be reminded when the probability of encountering is greater than a certain threshold.

As an optional implementation, after sending the message, the method further includes: for each target terminal, determining whether the distance between the terminal and the target terminal is less than a distance threshold or not; counting the number of times that the distance between the terminal and the target terminal is less than the distance threshold, and updating the association level between the terminal and the target terminal when the number of times that the distance between the terminal and the target terminal is less than the distance threshold is greater than a threshold of the number of encounters.

Specifically, when the distance between the terminal and a certain target terminal is less than the distance threshold, it means that the terminal may encounter the target terminal at this time. When the number of encounters is greater than a certain value, it means that the intimacy degree between the terminal and the target terminal may increase. Now the association level between the terminal and the target terminal can be updated, that is, the association level is increased.

On the basis of the foregoing embodiment, determining of whether the distance between the terminal and each target terminal is less than the corresponding preset distance or not is performed in sequence in accordance with the order of the association level, where the preset distance is correspondingly set according to the association level. It is realized that the reminding of whether other users with a higher association level with the user are nearby is given to the user preferentially.

Figure 5:
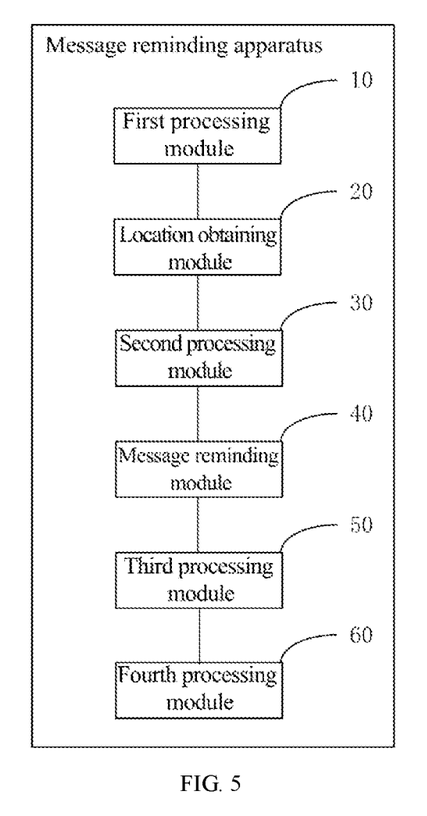
FIG. 5 is a schematic structural diagram of a message reminding apparatus according to the present disclosure.

In a second aspect, an example of the present disclosure provides a message reminding apparatus. FIG. 5 is a schematic structural diagram of a message reminding apparatus according to the present disclosure. It should be noted that the message reminding apparatus can be set either in a terminal or in a server side, that is, both the terminal and the server side can execute the message reminding method. As shown in FIG. 5, the message reminding apparatus includes:

a first processing module 10, configured to bind a terminal with at least one target terminal, and set an association level between the terminal and each target terminal; a location obtaining module 20, configured to obtain current location information of the terminal and each target terminal; a second processing module 30, configured to determine respectively whether a distance between the terminal and each target terminal meets a preset condition corresponding to the association level or not, according to the current location information of the terminal and each target terminal; a message reminding module 40, configured to send a message to remind the terminal that there is a target terminal that meets the preset condition.

In other optional implementations, the location obtaining module 20 is specifically configured to: obtain the current location information of the terminal; determine whether the current location information of the terminal is a normal location of the terminal or not; if not, obtain the current location information of each target terminal bound with the terminal.

In other optional implementations, the second processing module 30 is specifically configured to:

determine in sequence whether the distance between the terminal and each target terminal is less than a corresponding preset distance or not, in accordance with an order of the association level, where the preset distance is correspondingly set according to the association level.

In other optional implementations, a third processing module 50 is further included, and the third processing module 50 is configured to: store a location where the terminal is located when the message is sent, and when a frequency of sending the message at the location is higher than a preset threshold, predicting a probability of encountering the target terminal when the terminal enters the location next time.

In other optional implementations, a fourth processing module 60 is further included, and the fourth processing module 60 is configured to:

for each target terminal, determine whether the distance between the terminal and the target terminal is less than a distance threshold or not; count the number of times that the distance between the terminal and the target terminal is less than the distance threshold, and update the association level between the terminal and the target terminal when the number of times that the distance between the terminal and the target terminal is less than the distance threshold is greater than a threshold of the number of encounters.

In other optional implementations, before determining whether the current location information of the terminal is the normal location of the terminal or not, the location obtaining module is further configured to:

obtain a moving trajectory of the terminal within preset time, and determine the normal location of the terminal according to the moving trajectory.

Using the message reminding apparatus provided by the example of the present disclosure, the first processing module binds the terminal with at least one target terminal, and sets the association level between the terminal and each target terminals; the location obtaining module obtains the current location information of the terminal and each target terminal; the second processing module determines respectively whether the distance between the terminal and each target terminal meets the preset condition corresponding to the association level or not, according to the current location information of the terminal and each target terminal; the message reminding module sends the message to remind the terminal that there is the target terminal that meets the preset condition. That is, in the example of the present disclosure, by first setting the association level between the terminal and each target terminal, and then determining whether each target terminal meets the preset condition corresponding to the association level or not, a determination of whether to send a message reminder according to user needs is realized, facilitating the communication between a user and other people, and improving the user experience.

Figure 6:
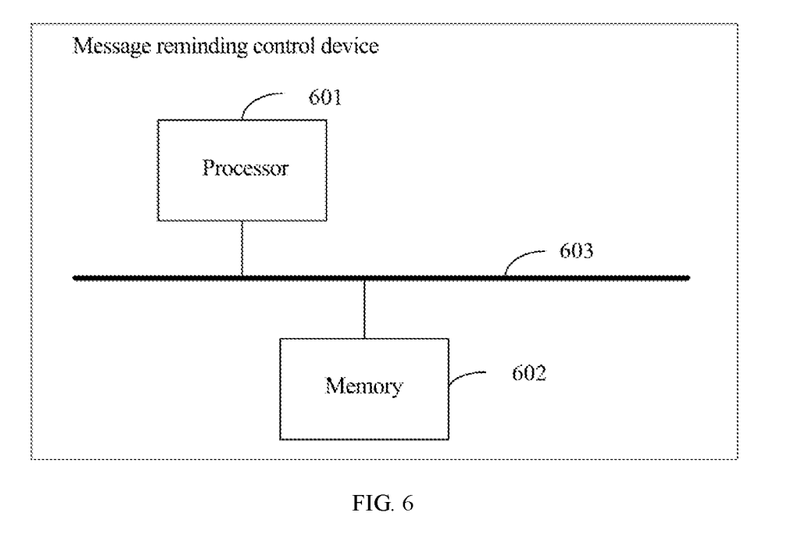
FIG. 6 is a schematic diagram of a hardware structure of a message reminding control device provided by the present disclosure.

In a third aspect, an example of the present disclosure provides a message reminder control device. FIG. 6 is a schematic diagram of a hardware structure of a message reminding control device provided by the present disclosure which, as shown in FIG. 6, includes:

at least one processor 601 and a memory 602.

In a specific implementing process, the at least one processor 601 executes computer execution instructions stored in the memory 602, so that the at least one processor 601 executes the above message reminding method, where the processor 601 and the memory 602 are connected through a bus 603.

For the specific implementing process of the processor 601, the above method embodiments can be referred to. The implementation principles and technical effects thereof are similar, and will not be repeated here in this embodiment.

In the embodiment shown in FIG. 6 above, it should be understood that the processor may be a central processing unit (CPU), or other general-purpose processors, a digital signal processor (DSP), an application specific integrated circuit (ASIC), etc. A general-purpose processor may be a microprocessor or the processor may also be any conventional processor or the like. The steps of the method disclosed in combination with the disclosure can be directly embodied as being executed by a hardware processor, or executed by a combination of hardware and software modules in the processor.

The memory may include a high-speed RAM memory, and may also include a non-volatile storage NVM, such as at least one disk storage.

The bus can be an industry standard architecture (ISA) bus, a peripheral component interconnect (PCI) bus, or an extended industry standard architecture (EISA) bus, etc. The bus can be divided into an address bus, a data bus, a control bus and the like. For ease of representation, the bus(es) in the accompanying drawings of the present disclosure is(are) not limited to only one bus or one type of buses.

In a fourth aspect, the present disclosure further provides a readable storage medium, having computer executable instructions stored thereon, where when a processor executes the computer executable instructions, the above message reminding method is implemented.

The above-mentioned readable storage medium may be implemented by any type of volatile or non-volatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The readable storage medium may be any available medium that can be accessed by a general-purpose or special-purpose computer.

An exemplary readable storage medium is coupled to the processor, so that the processor can read information from the readable storage medium and can write information into the readable storage medium. Of course, the readable storage medium may also be an integral part of the processor. The processor and the readable storage medium may be located in application specific integrated circuits (ASICs). Of course, the processor and the readable storage medium may also exist in a device as discrete components.

Those of ordinary skill in the art can understand that: all or part of the steps in the above method embodiments may be implemented by hardware related to program instructions. The aforementioned program may be stored in a computer readable storage medium. When the program is executed, the steps including the above method embodiments are executed. The foregoing storage medium includes: a ROM, a RAM, a magnetic disk, an optical disk, or other various media that can store program codes.

Finally, it should be noted that: the above embodiments are only used to illustrate the technical solutions of the present disclosure, not to limit them; although the present disclosure has been described in detail with reference to the foregoing embodiments, those of ordinary skill in the art should understand that: the technical solutions described in the foregoing embodiments can still be modified, or some or all of the technical features may be equivalently substituted; these modifications or substitutions do not make the essence of the corresponding technical solutions deviate from the scope of the technical solutions of the embodiments of the present disclosure.

What is claimed is:

1. A message reminding method, comprising:
   binding a terminal with at least one target terminal, and setting an association level between the terminal and each target terminal;
   obtaining current location information of the terminal and each target terminal;
   determining respectively whether a distance between the terminal and each target terminal meets a preset condition corresponding to the association level or not, according to the current location information of the terminal and each target terminal;
   if the distance between the terminal and at least one target terminal meets the preset condition corresponding to the association level, sending a message to remind the terminal that there is a target terminal that meets the preset condition.

2. The message reminding method according to claim 1, wherein obtaining the current location information of the terminal and each target terminal comprises:
   obtaining the current location information of the terminal;
   determining whether the current location information of the terminal is a normal location of the terminal or not;
   if not, obtaining the current location information of each target terminal bound with the terminal.

3. The message reminding method according to claim 1, wherein determining respectively whether the distance between the terminal and each target terminal meets the preset condition corresponding to the association level or not comprises:
   determining in sequence whether the distance between the terminal and each target terminal is less than a corresponding preset distance or not, in accordance with an order of the association level, wherein the preset distance is correspondingly set according to the association level.

4. The message reminding method according to claim 2, wherein determining respectively whether the distance between the terminal and each target terminal meets the preset condition corresponding to the association level or not comprises:
   determining in sequence whether the distance between the terminal and each target terminal is less than a corresponding preset distance or not, in accordance with an order of the association level, wherein the preset distance is correspondingly set according to the association level.

5. The message reminding method according to claim 3, wherein after sending the message to remind the terminal that there is the target terminal that meets the preset condition, the message reminding method further comprises:

storing a location where the terminal is located when the message is sent, and when a frequency of sending the message at the location is higher than a preset threshold, predicting a probability of encountering the target terminal when the terminal enters the location next time.

6. The message reminding method according to claim 4, wherein after sending the message to remind the terminal that there is the target terminal that meets the preset condition, the message reminding method further comprises: storing a location where the terminal is located when the message is sent, and when a frequency of sending the message at the location is higher than a preset threshold, predicting a probability of encountering the target terminal when the terminal enters the location next time.

7. The message reminding method according to claim 3, after sending the message, further comprising: for each target terminal, determining whether the distance between the terminal and the target terminal is less than a distance threshold or not; counting the number of times that the distance between the terminal and the target terminal is less than the distance threshold, and updating the association level between the terminal and the target terminal when the number of times that the distance between the terminal and the target terminal is less than the distance threshold is greater than a threshold of the number of encounters.

8. The message reminding method according to claim 4, after sending the message, further comprising: for each target terminal, determining whether the distance between the terminal and the target terminal is less than a distance threshold or not; counting the number of times that the distance between the terminal and the target terminal is less than the distance threshold, and updating the association level between the terminal and the target terminal when the number of times that the distance between the terminal and the target terminal is less than the distance threshold is greater than a threshold of the number of encounters.

9. The message reminding method according to claim 2, before determining whether the current location information of the terminal is the normal location of the terminal or not, the message reminding method further comprises:
obtaining a moving trajectory of the terminal within preset time, and determining the normal location of the terminal according to the moving trajectory.

10. A message reminding apparatus, comprising at least one processor and a memory, the memory communicatively connected with the at least one processor; wherein,
the memory stores computer execution instructions executable by the at least one processor, and when the at least one processor executes the computer execution instructions, the at least one processor is configured to:
bind a terminal with at least one target terminal, and set an association level between the terminal and each target terminal;
obtain current location information of the terminal and each target terminal;
determine respectively whether a distance between the terminal and each target terminal meets a preset condition corresponding to the association level or not, according to the current location information of the terminal and each target terminal;
when the distance between the terminal and at least one target terminal meets the preset condition corresponding to the association level, send a message to remind the terminal that there is a target terminal that meets the preset condition.

11. The message reminding apparatus according to claim 10, wherein the at least one processor is specifically configured to:
obtain the current location information of the terminal;
determine whether the current location information of the terminal is a normal location of the terminal or not;
if not, obtain the current location information of each target terminal bound with the terminal.

12. The message reminding apparatus according to claim 10, wherein the at least one processor is specifically configured to:
determine in sequence whether the distance between the terminal and each target terminal is less than a corresponding preset distance or not, in accordance with an order of the association level, wherein the preset distance is correspondingly set according to the association level.

13. The message reminding apparatus according to claim 11, wherein the at least one processor is specifically configured to:
determine in sequence whether the distance between the terminal and each target terminal is less than a corresponding preset distance or not, in accordance with an order of the association level, wherein the preset distance is correspondingly set according to the association level.

14. The message reminding apparatus according to claim 12, wherein the at least one processor is configured to:
store a location where the terminal is located when the message is sent, and when a frequency of sending the message at the location is higher than a preset threshold, predicting a probability of encountering the target terminal when the terminal enters the location next time.

15. The message reminding apparatus according to claim 13, wherein the at least one processor is configured to:
store a location where the terminal is located when the message is sent, and when a frequency of sending the message at the location is higher than a preset threshold, predicting a probability of encountering the target terminal when the terminal enters the location next time.

16. The message reminding apparatus according to claim 12, wherein the at least one processor is configured to:
for each target terminal, determine whether the distance between the terminal and the target terminal is less than a distance threshold or not; count the number of times that the distance between the terminal and the target terminal is less than the distance threshold, and update the association level between the terminal and the target terminal when the number of times that the distance between the terminal and the target terminal is less than the distance threshold is greater than a threshold of the number of encounters.

17. The message reminding apparatus according to claim 13, wherein the at least one processor is configured to:
for each target terminal, determine whether the distance between the terminal and the target terminal is less than a distance threshold or not; count the number of times that the distance between the terminal and the target terminal is less than the distance threshold, and update the association level between the terminal and the target terminal when the number of times that the distance between the terminal and the target terminal is less than the distance threshold is greater than a threshold of the number of encounters.

18. The message reminding apparatus according to claim 11, before determining whether the current location information of the terminal is the normal location of the terminal or not, the at least one processor is further configured to:
obtain a moving trajectory of the terminal within preset time, and determine the normal location of the terminal according to the moving trajectory.

19. A non-transitory readable storage medium, having computer executable instructions stored thereon, wherein the computer executable instructions are executed by a processor to perform operations of:
binding a terminal with at least one target terminal, and setting an association level between the terminal and each target terminal;
obtaining current location information of the terminal and each target terminal;
determining respectively whether a distance between the terminal and each target terminal meets a preset condition corresponding to the association level or not, according to the current location information of the terminal and each target terminal;
if the distance between the terminal and at least one target terminal meets the preset condition corresponding to the association level, sending a message to remind the terminal that there is a target terminal that meets the preset condition.

20. The non-transitory readable storage medium according to claim 19, wherein the computer executable instructions are executed by the processor to perform operations of:
obtaining the current location information of the terminal;
determining whether the current location information of the terminal is a normal location of the terminal or not;
if not, obtaining the current location information of each target terminal bound with the terminal.

* * * * *